United States Patent Office 2,974,134
Patented Mar. 7, 1961

2,974,134
SURFACE ACTIVE GLUCOSE ETHERS

Ernest L. Pollitzer, Hinsdale, Ill., assignor, by mesne assignments, to Universal Oil Products Company, Des Plaines, Ill., a corporation of Delaware No Drawing. Filed Dec. 2, 1957, Ser. No. 699,927

1 Claim. (Cl. 260—209)

This invention relates to a new class of surface active agents and to a special technique for producing the same, said surface active agents being characterized as the mono- and poly-ethers of glucose monomer and polymers containing up to four hexose units in which the hydrocarbon group of the ether radicals contains a sufficient number of carbon atoms to provide a hydrophobic radical essential to the development of surface activity in the resultant ethers and in which the saccharide residue contains a sufficient number of hydroxyl groups to provide a sufficiently hydrophilic radical to produce a surface active product. More specifically, this invention concerns the conversion of water insoluble polysaccharides selected from the group consisting of starch and cellulose into the alkali metal derivatives of at least a portion of the hydroxyl groups present in said polysaccharide structure, thereafter condensing the resulting alkali metal polysaccharide derivatives with a hydrocarbon derivative containing a hydrophobic hydrocarbon group and hydrolyzing the resulting etherified polysaccharide at conditions which result in the depolymerization of the polysaccharide to the corresponding ethers of glucose and polyglucose containing up to 4 glucose monomer units and up to 20 carbon atoms per molecule.

Polysaccharides containing a free hydroxyl group or a hemi-acetal linkage (which reacts in a manner similar to an hydroxyl radical) have heretofore been alkylated to thereby convert the hydroxyl or hemi-acetal group into the corresponding alkoxy group. The resulting alkyl ethers of the polysaccharide have also heretofore been hydrolyzed under conditions which effect depolymerization of the poly-glucose linkages to form the corresponding alkyl ethers of the resulting monomeric glucose. Such processes, however, have generally been limited to alkylations involving the use of short chain alkylating agents, for example, containing from one to four carbon atoms, producing glucose alkylates which are highly water soluble and have no substantial degree of surface activity. This invention, on the other hand, concerns certain ethers of glucose and of the dimer, trimer and tetramer polymers of glucose (oligosaccharides) in which the hydrocarbon group of the ether radical contains at least six carbon atoms. Ether groups of such hydrocarbon content have sufficient hydrophobic effect that when combined with the hydrophilic saccharose residue, results in a product having pronounced nonionic surface activity. Such materials, formed as one of the primary products of this invention, contain a hexose polymer residue attached to a single hydrophobic ether radical and are the water-soluble detergent fraction of the present process. A second class of products of this invention are characterized as containing two or more ether groups per molecule, having at least six carbon atoms per ether group and at least one but generally not more than two hexose units per molecule. These materials are separated from the gross product of the present process and are characterized by their relatively high solubility in organic solvents and their insolubility in water, being primarily useful as surface active agents in non-aqueous or organic media, such as dry cleaning fluids, lubricating oils, greases, etc. The process of this invention yields a gross product separable into at least two fractions, one fraction being characterized generally by its solubility in water and other fraction by its solubility in organic solvents. The water-soluble portion of the product is an ether of a saccharose containing from two to generally not more than four hexose units per hexose polymer and from one to three hydrocarbon ether radicals per molecule having a total aggregate carbon atom content of at least six, but not more than twenty. The fraction of the gross product relatively insoluble in water, but soluble in organic solvents, is a saccharose ether generally containing from one to two hexose units, but which may contain from one to three hydrocarbon ether groups per molecule, each ether group containing from six to about twenty carbon atoms. The saccharose ethers comprising the water-soluble fraction of the gross product have been found to be highly effective non-ionic surface active agents, particularly detergents, in aqueous systems, thereby providing a product particularly useful in many home laundering and cleaning uses.

The foregoing and other considerations involved in the present invention will be hereinafter more fully described.

In one of its embodiments this invention relates to a surface active agent having the following empirical formula:

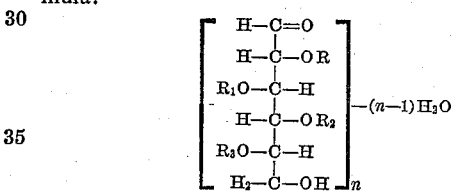

wherein R, $R_1$, $R_2$ and $R_3$ are selected from the group consisting of hydrogen and monovalent hydrocarbon containing at least six carbon atoms, and $n$ is a whole number having a value of from 1 to 4, said surface active agent being further characterized in that at least one of said R, $R_1$, $R_2$ and $R_3$ is a monovalent hydrocarbon group containing from about 6 to about 20 carbon atoms per group, the total aggregate number of carbon atoms in said monovalent hydrocarbon radicals being not substantially in excess of about twenty per molecule.

Another embodiment of this invention concerns a process for preparing a surface active agent of the alkyl saccharide ether class which comprises reacting a polysaccharide selected from the group consisting of cellulose and starch with an alkali metal hydroxide at reaction conditions which result in the formation of an alkali metal salt derivative of at least one of the free hydroxyl groups of said polysaccharide, condensing the resulting alkali metal salt with an alkyl halide containing from six to about twenty carbon atoms at reaction conditions which result in the formation of an alkyl ether of said polysaccharide containing not more than an average of about twenty alkyl carbon atoms per hexose trimer in the resulting polysaccharide alkylate, hydrolyzing said polysaccharide alkyl ether in the presence of a mineral acid and at reaction conditions sufficient to depolymerize said alkyl polysaccharide to form thereby an alkyl saccharide containing from one to four hexose units, and separating a water-soluble surface active agent comprising a fraction of the product of said reaction soluble in water from a water-insoluble alkyl saccharide comprising a surface active agent soluble in an organic solvent.

In the preparation of the intermediate hydrocarbon-substituted polysaccharides which involves condensing one or more of the hydroxyl groups of the polysaccharide with an etherifying agent capable of transferring a hydrocarbon group containing at least six carbon atoms to the polysaccharide, it is generally found desirable to convert the hydroxyl groups of the polysaccharide starting material into their metallate salts prior to or simultaneous with the condensation reaction, generally by replacement of the hydroxyl hydrogen atom of the polysaccharide with an alkali metal, to thereby form the so-called metallate derivative of the polysaccharide.

In the condensation stage of the process the aforesaid intermediate metallate is reacted with a suitable etherifying agent at reaction conditions which result in the interaction of one or more, up to four, of the available hydroxyl groups present in each hexose unit of the polysaccharide structure with the etherifying agent to form a condensate containing one or more alkyl groups derived from the alkylating agent, the number of substitutions taking place in the reaction depending upon the stoichiometric amounts of the reactants and also upon the severity of the reaction conditions. Thus, the polysaccharide, which is made up of polymerized hexose units, each unit of which contains four available hydroxyl groups, is capable of reacting with the etherifying agent such as an alkyl halide, an aralkyl halide or other monohalogen-substituted hydrocarbon derivative containing the desired hydrophobic hydrocarbon radical to replace the hydrogen atom of the hydroxyl group in the structure of the polysaccharide with the involved hydrocarbon radical which is thereby transferred to the polysaccharide as a result of the condensation reaction. For example, in the use of an alkyl halide, comprising one of the preferred classes of etherifying agent herein, the halogen radical of the alkyl halide combines with the metallic group of the metallate to form a metal halide and the alkyl residue of the alkyl halide, becomes attached to the oxygen atom of the polysaccharide to form the desired ether intermediate. Following completion of the condensation stage of the present process in which an ether derivative of the polysaccharide is formed which contains an average of at least one, and generally not more than three hydrocarbon groups per hexose trimer unit, each hydrocarbon group containing at least six carbon atoms and at least a total of 9 alkyl carbon atoms per hexose trimer unit, the resulting polysaccharide ether is subjected to an hydrolysis reaction, usually in the presence of a hydrolyzing acid, to form a mixture of alkyl ethers of glucose, glucose dimer, glucose trimer, and glucose tetramer which is thereafter separated into a water-soluble fraction and a water-insoluble fraction soluble, however, in organic solvents.

The polysaccharide starting material may be obtained from any suitable source, but it is generally derived from agricultural sources which yield starch or cellulose as a relatively pure product. Thus, typical sources of cellulose include, for example, cotton linters which represent the purest form of cellulose, saw dust, wood chips, wood pulp, and vegetable fibers generally, which may contain other components as impurities, such as lignin, insulin, and compounds of organic or inorganic composition. The latter impurities may generally be removed quite effectively from the raw source of cellulose by subdividing the particles of raw cellulose starting material into a tattered or shredded form, followed by suspending the thus comminuted particles in an aqueous suspension which may be further treated with intermediate reagents, such as sulfur dioxide, to extract undesirable impurities, as in the removal of lignin by the aforementioned sulfur dioxide extraction. Such impurities, however, need not necessarily be removed from the crude source of the polysaccharide, but may be recovered from the final product of the present process as a residue insoluble in water and insoluble in organic solvents, such residue also generally including unreacted polysaccharide, if any, which remains after the successive series of reactions constituting the present process.

Various agricultural sources of starch which may provide the raw starting material for the process herein include the purified starch fractions of wheat, corn, potatoes and rice, as well as from other commonly recognized sources of this material. In many instances the raw starch or cellulose is in the form of polysaccharide granules encased within a sheath of non-reactive, horn-like polysaccharide which renders the starch resistant to attack by the involved reagents, as for example, in the subsequent metallation and etherification reactions. In addition to grinding and maceration of the raw starch or cellulose in an aqueous suspending medium, the starch and cellulose granules may be converted into a more reactive form by rupturing the surrounding sheath to thereby permit access of reagents involved in the succeeding stages of the process to the polysaccharide granules within the sheath. Reagents which effect softening or rupturing of the polysaccharide sheath are referred to as peptizing agents and are generally members of the class of organic compounds selected from the alcohols (such as methanol, ethanol, n-propanol, isopropanol, etc.), ketones (such as acetone, methylethylketone, etc.), polyols (such as ethylene glycol, propylene glycol, glycerol, diethylene glycol, dipropylene glycol, etc.), aldehydes (such as formaldehyde, acetaldehyde, etc.), carboxylic acids, preferably compounds within the above class of organic liquids which are of relatively low molecular weight, and more preferably, the low molecular weight alcohols and polyols, such as methanol, ethanol and ethylene glycol. The peptizing treatment is desirably effected at an elevated temperature and pressure in order to obtain the maximum conversion of the polysaccharide to its peptized form, generally at temperatures above the boiling point of water and at sufficiently super-atmospheric pressures to maintain the peptizing agent in a substantially liquid phase, for example, at temperatures of from about 100° to about 150° C. and at pressures of from atmospheric to 100 atmospheres or more, depending upon the source of the polysaccharide which determines the reaction conditions required. The recovered starch or cellulose in finely divided form is dried prior to its use in the last of the succeeding stages of the present process.

The conversion of the polysaccharide whether utilizing the raw cellulose or starch starting material or its peptized or finely divided form to the hydrocarbon ethers of the resident hydroxyl groups is effected by reacting the polysaccharide or preferably the metallate derivative thereof (that is, the present so-called polysaccharide salt of an alkali metal) with an etherifying agent, such as an alkyl halide containing the desired number of carbon atoms to provide at least one hydrophobic hydrocarbon group containing at least six carbon atoms per group and a total aggregate of hydrocarbon carbon atoms of at least nine, up to about twenty and more preferably from about twelve to about fifteen per glucose trimer unit (average ultimate hydrolysate) of the polysaccharide. The ratio of etherifying agent to polysaccharide charged to the condensation reaction and the reaction conditions selected for the etherification reaction are so chosen as to result in the condensation of sufficient hydrocarbon radicals on the saccharose structure to provide the aforesaid ratio of hydrophobic hydrocarbon groups to hydrophilic glucose trimer units. Although the condensation reaction may be effected by reacting the etherifying agent with the polysaccharide directly, without intermediate conversion of the polysaccharide to its metallate salt, the reaction is preferably preceded by converting the polysaccharide starting material into an alkali metal salt thereof (herein referred to as the metallate derivative of the polysaccharide), the subsequent condensation with the etherifying agent thereafter generally proceeding at a more rapid rate, accompanied by more complete conversion of the polysaccharide into the desired ether derivative. The initial conversion of the polysaccharide to its alkali metal salt may be accomplished by heating the polysaccharide with the corresponding alkali metal hydroxide, the latter preferably being in the form of an aqueous solution thereof. The metallation is effected at a relatively high temperature, and preferably in a confined reaction zone, such as an autoclave, in order to maintain the aqueous alkali in substantially liquid phase. Although any of the alkali metal hydroxides may be utilized for this conversion, including lithium hydroxide, sodium hydroxide and potassium hydroxide, the preferred alkali for this purpose is sodium hydroxide which is not only effective but least costly of the alkalis suitable for this purpose. The aqueous alkali is preferably supplied to the reaction zone in concentrated form, for example, containing from 5 to about 30% by weight of the alkali metal hydroxide in solution and in an amount corresponding to from about 1.5 to about 10 moles of alkali metal hydroxide per glucose unit of the polysaccharide. According to one method of conversion, the polysaccharide is heated at a temperature of from about 80° to about 250° C. in the presence of the aqueous alkali; when temperatures above the boiling point of water are utilized in the reaction, nitrogen or other inert gas at a pressure sufficient to maintain the reaction mixture in substantially liquid phase may be charged, together with the other reactants, into the autoclave. At these process conditions, from one to four hydroxyl groups per hexose unit of the polysaccharide is converted to its alkali metal derivative (i.e. the metallate intermediate), depending upon the molar proportion of alkali metal hydroxide per hexose unit charged to the reaction zone. The number of hydroxyl groups converted to the metallate salt will be determined by the desired number of ether groups to be introduced into the polysaccharide molecule, which, in turn, will determine the properties of the final product, particularly its solubility in aqueous or non-aqueous solvents. Thus, if only one hydroxyl group per hexose trimer unit is to be converted to its ether derivative, to form a water-soluble surface active product, only one of the twlve available hydroxyl groups per hexose trimer unit (average) need be converted to the alkali metal metallate in the preliminary metallation reaction. If a water-insoluble product having surface activity in organic solvents is desired as the ultimate product of the present process, additional hydroxyl groups of the polysaccharide must be converted to their alkali metal salts in the preliminary metallation reaction or an etherifying agent having a greater number of carbon atoms per molecule must be utilized if the final product is to have a sufficient proportion of hydrophobic to hydrophilic groups to provide a surface active agent soluble in organic solvents.

Although it is generally preferred to convert the polysaccharide into an alkali metal salt derivative of the hydroxyl groups in a preliminary reaction prior to the condensation thereof with the etherifying agent under certain modified conditions of reaction, the polysaccharide may be converted to its ether derivative without prior formation of the alkali metal salt intermediate. In most instances, however, the yield of ether product by means of the latter alternative reaction mechanism is not as great as in the process involving the intermediate formation of the alkali metallate salt of the polysaccharide prior to the condensation of the intermediate with the etherifying agent. Thus, an alkyl ether of the polysaccharide may also be formed by heating the polysaccharide in the presence of water and with an alkyl halide at a temperature above about 100° C. and at a superatmospheric pressure, up to about 100 atmospheres, to form the desired poly-alkyl-substituted polysaccharide intermediate product. This reaction will generally proceed at temperatures in the region of 100° C., but when utilizing the polysaccharide (i.e., without prior metallation) as the starting material in the latter metathesis-type reaction, temperatures substantially above about 100° C., preferably above about 150° C., are generally required to produce significant yields of the desired polysaccharide ether.

As hereinbefore indicated, the preferred etherifying agents are the hydrocarbon halides containing a hydrophobic hydrocarbon group. Suitable halogen-substituted hydrocarbon etherifying agents may be selected from the chlorides, bromides and iodides. When a relatively short-chain alkyl radical is to be transferred to the polysaccharide during the condensation reaction, such as a hexyl or octyl group, from two to about four molar proportions of etherifying agent are generally required per hexose trimer unit of the polysaccharide in order to form a surface active ether, whereas when a relatively longer chain alkyl radical or aralkyl radical containing a greater number of carbon atoms is to be substituted on one or more of the hydroxyl groups of the polysaccharide, for example, a dodecyl or octadecyl radical, preferably from one to two molar proportions of etherifying agent per hexose trimer unit are supplied to the condensation reaction in order to form a polysaccharide ether which when subsequently hydrolyzed (preferably to a glucose polymer having an average of 3 glucose units per molecule, or in other words, to the trimer stage) will produce a mono-ether having surface activity in aqueous solution.

The hydrocarbon halide or other hydrocarbon derivative utilized as etherifying agent may be of cyclic, straight-chain or branched-chain configuration, although generally the straight-chain alkyl halides have a greater hydrophobic effect per carbon atom than their cyclic and branched-chain analogs. It is also feasible to employ a mixture of various alkyl halides, such as a mixture of isomers having the same molecular weight, represented, for example, by a mixture of $C_6$ chlorides comprising n-hexyl chloride, cyclohexyl chloride, a 2,3-dimethylbutyl chloride, a 2-methylamyl chloride, a 3-methylamyl chloride, a 4-methylamyl chloride or a 3-ethylbutyl chloride. It is generally preferred to utilize a single specie of etherifying agent (such as a specific isomer having a specific molecular weight, etc.), although when mixtures of alkyl halides are more available, these may also be employed. Thus, a mixture of various alkyl halides generally results when a particular boiling range fraction of petroleum is halogenated to form the corresponding mono-halo alkyl halides, the petroleum fraction comprising all of the various isomers of the material having a narrow boiling range, as well as certain homologs thereof. In some instances, it becomes desirable to halogenate the hydrocarbon fraction initially and thereafter separate a desired fraction corresponding to a particular isomer from the resulting mixture of alkyl halides, utilizing the separated alkyl halide fraction as the etherifying agent. When the desired alkylating agent is one which yields a long chain alkyl radical, a particularly suitable source of such alkyl groups is an alkyl halide comprising a halogenated higher boiling fraction of petroleum, such as a halogenated kerosene fraction which may contain alkyl halides containing from twelve to about twenty carbon atoms per molecule. In other instances, for example, when a straight chain alkyl group is desired in the final product, a polymer of ethylene, subsequently hydrohalogenated to form an alkyl halide therefrom, may be utilized as the starting alkyl halide reactant. Ethylene polymers are essentially straight chain molecules from which alkyl halides may be formed by hydrohalogenation; the resulting halide is similar in structure to the preferred straight chain alkyl halides formed by halogenating the hydrocarbon components of a paraffinic petroleum cut. A more highly branched chain alkyl halide may be formed, for example, by hydrohalogenation of a propylene polymer, the latter being a particularly desirable source of such alkylating agents when products having such structures are desired. The most efficient surface active products are formed from the alkyl ethers of glucose containing a single, long-chain alkyl group per hexose trimer unit (average) in which the alkyl group contains from about six to about twenty, and more preferably, from about nine to about twelve carbon atoms. However, it is also feasible to supply the hydrophobic portion of the ultimate detergent molecule by multiple substitution of short chain alkyl groups on an equivalent number of hydroxyl groups of the polysaccharide; thus, hydrophobic hydrocarbon groups containing, in the aggregate, eighteen carbon atoms per hexose trimer may be supplied by three hexyl group substitutions per hexose trimer.

Another desirable class of etherifying agents utilizable herein, which form polysaccharide ethers from which water-soluble detergents are formed via selective hydrolysis of the intermediate polysaccharide ether, are the cyclic hydrocarbon-substituted alkyl halides which for purposes of identification in the present process and product are characterized as the cyclic hydrocarbon-substituted ether derivatives, including the aryl-substituted as well as the cycloalkyl-substituted ether derivatives, such as benzyl chloride (a phenyl-substituted methyl halide), 1-phenyl-2-chloroethane, 1-cyclohexyl-2-bromoethane, 1-tolyl-3-chloropropane, etc., containing up to about four carbon atoms in the alkyl chain substituted by the cyclic hydrocarbon group. Other cyclic hydrocarbon-containing etherifying agents useful herein as the source of the hydrophobic radical of the ultimate surface active product are the alkylphenyl chlorides, bromides, and iodides containing from one to about twelve carbon atoms in the alkyl-substituent, such as tolylchloride, 4-hexylphenylbromide, 3-nonylphenylbromide, 4-dodecyl-phenylchloride, etc.

Following completion of the condensation reaction between the polysaccharide and the etherifying agent, the resulting water-insoluble ether of the polysaccharide is subjected to hydrolysis under conditions whereby the polysaccharide structure is depolymerized into oligosaccharide ethers (i.e., polymers of glucose containing from two to four glucose monomer units) containing an average of one to two ether groups per hexose trimer unit. The hydrolysis or depolymerization of the polysaccharide is effected in the presence of a catalyst (preferably a mineral acid) of sufficient strength and activity to rupture the polysaccharide structure. The reaction converts the intermediate, water-insoluble polysaccharide ether into the corresponding ethers of the oligoglucosides which contain two additional hydrophilic groups (one aldehyde and one hydroxyl) per molecule of hydrolyzed ether than were present in the structure of the polysaccharide. The hydrolytic depolymerization reaction produces a mixture of the hydrocarbon ethers of glucose, generally a small amount of glucose itself, and a mixture of the hydrocarbon ethers of glucose dimer, glucose trimer and glucose tetramer, referred to generally as an oligoglucoside ether, which in many instances are soluble in water, particularly when only one ether radical occurs in each oligosaccharide unit or in the case of the glucose alkylates, when the number of carbon atoms in the hydrocarbon radicals of the glucose ether is relatively few, for example, not more than about nine in number.

The hydrolysis of the polysaccharide ether is effected in the presence of water at a temperature of from about 50° to about 150° C., utilizing a mineral acid catalyst selected from the group consisting of sulfuric acid, hydrochloric acid, hydrobromic acid, a phosphoric acid, such as pyrophosphoric, or in the presence of an acid-acting compound which provides a sufficient concentration of hydrogen ions in the aqueous solution to catalyze the desired hydrolysis or depolymerization. In the use of the term "mineral acid" herein, it is intended that such term include only the above strong acids or a compound which generates such an acid on hydrolysis. In general, very little of the mineral acid is required to accomplish the hydrolytic effect, preferably not more than about 10% by weight of the polysaccharide ether introduced into the process. In addition, the hydrolyzing acid need not be of high concentration, although generally an acid of at least 0.5, up to about 5 Normality is preferred. The reaction mixture following completion of the hydrolysis (generally for a period not to exceed 0.5 hour with an acid hydrolytic agent of relatively low concentration and preferably not larger than 10 minutes in the presence of more concentrated acids) is neutralized as rapidly as possible with aqueous caustic or with ammonia to stop further hydrolysis. The product which remains in the aqueous solution may be utilized directly in the form of its aqueous solution which may be diluted with water to reduce its viscosity. It is usually found that a portion of the product, generally the glucose ethers (mono- and poly-substituted ethers) are substantially insoluble in water and following the hydrolytic treatment of the polysaccharide ether, these products generally separate as an upper layer or as an insoluble flocculent precipitate, suspended in the aqueous solution of water-soluble product. Since these ethers are miscible with organic solvents, they may be extracted from the hydrolytic reaction mixture with petroleum ether, diethylether, ester extractants such as butylaceate, etc., the lipophilic surface active product being recoverable from the organic solvent extract by evaporation of the solvent therefrom. Any unreacted (i.e., depolymerized) polysaccharide or any non-reactive impurity in the initial polysaccharide charge stock remains as an insoluble residue when the water-insoluble, organic solvent-soluble fraction is removed from the crude hydrolysate by extraction of the organic solvent-soluble portion therefrom. Such residue may be discarded or recycled, particularly if it contains an appreciable proportion of polysaccharide.

As previously indicated, the products of this invention are surface active agents (some of which are sufficiently active that they possess detergency) and may be soluble in water depending upon the proportion of hydrophilic hydroxyl and formyl radicals to hydrophobic methylene groups in the structure of the product. A portion of the product, as indicated above, and depending upon its molecular weight, may also be substantially insoluble in water, but soluble in organic solvents, such as liquid hydrocarbons, and may possess surface activity in non-aqueous solutions. The solubility of the glucose ether product in general depends upon the number and the chain length of the hydrocarbon substituents comprising the ether radicals as balanced against the number of hydrophilic saccharide units in the structure of the molecule. When the total number of carbon atoms present in the one or more hydrophobic ether radicals exceeds about twenty per molecule in number, whether such carbon atoms are distributed as three alkyl radicals, each containing at least six carbon atoms, as a dodecyl and an octyl radical or as a single, long-chain hydrocarbon group, such as a single nonadecyl or dodecylphenyl radical, the glucose or oligoglucoside ether derivative will tend to be relatively insoluble in water and substantially more soluble in a non-aqueous organic solvent, such as petroleum ether. The latter solution of saccharide ether, however, will possess surface activity in solution, if the ether contains the requisite balance of hydrophobic and hydrophilic radicals essential to the development of surface activity. Organic solvent-soluble products insoluble in water, comprising the ethers of glucose in which the hydrocarbon group of the ether radical contains six or more carbon atoms may also constitute a portion of the present hydrolysate product.

This invention is further illustrated with respect to several of its embodiments in the examples which follow; the examples, however, are intended for illustrative purposes only, no attempt being thereby intended to define limits to the scope of the invention.

EXAMPLE I 555 parts by weight of cotton linters (98% cellulose, capable of yielding approximately one mole of glucose trimer upon partial hydrolysis of the cellulose) is placed in a rotating, heated pressure autoclave with one liter of a 10% aqueous solution of sodium hydroxide (about 2.6 moles NaOH) and 50 cc. of methanol which assists in the peptization of the raw cellulose, the autoclave being thereafter closed and heated to a temperature of about 120° C. for three hours. The autoclave is thereafter cooled to room temperature and repeatedly extracted with water by stirring the sodium cellulose into 2-liter aliquots of de-ionized water, followed by filtering the aqueous suspension. After ten of such treatments the sodium cellulose (in the form of a white, fluffy powder, when dry) contains about 1.5 atoms of sodium per glucoside unit, the high molecular weight structure of the cellulose being retained.

Sodium cellulose prepared as indicated above is converted into its corresponding alkyl ethers by an etherification reaction with an alkyl halide corresponding in chain length to the alkoxy radical desired in the ultimate ether. As a source of alkyl halide, n-nonylene-1 (prepared by dehydration of n-nonyl alcohol over alumina at an elevated temperature) is converted to the corresponding n-nonyl chloride by hydrochlorination of the nonylene in the presence of a 10 to 1 molar excess of dry hydrogen chloride, the mixture of nonylene and HCl being passed over activated alumina at an elevated temperature and pressure and at a low space velocity to form the nonyl chloride. The resulting nonyl chloride uniformly boils at about 190° C. and its chloride content corresponds to the empirical formula $C_9H_{19}Cl$.

Three moles of the above sodium cellulose, based upon the supposition that each $C_6$ hexose unit of the sodium cellulose contains 1.5 atoms of sodium per unit, are mixed with 1.2 mole of n-nonylchloride (about 195 parts by weight) and one liter of an n-hexane dispersant in a rotating pressure autoclave. The resulting mixture is thereafter heated to a temperature of 140° C. as the autoclave is slowly rotated for a reaction period of 3 hours. After cooling, the organic portion of the produce is removed from the sodium chloride by-product by extraction thereof in diethyl ether and the ether extract thereafter fractionally distilled, initially at atmospheric pressure and thereafter at 3 mm. pressure to take overhead the ether extractant, the hexane diluent and unreacted nonyl chloride. Approximately 0.2 mole of the latter chloride is recovered.

The residue of the distillation from which the volatile portions have been removed is mixed with about six volumes of 1.0 N hydrochloric acid and the resulting mixture charged into a stirred kettle, the mixture thereafter being heated to its boiling point (about 105° C.) for 10 minutes, accompanied by vigorously stirring the mixture. Following the above hydrolytic treatment, the mixture is immediately neutralized with dilute sodium hydroxide to a pH of 7. The product, which is partially soluble and partially insoluble in warm (40° C.) water is extracted with 3 aliquots of 500 cc. of diethyl ether to remove the water-insoluble, ether-soluble portion from the aqueous solution. A non-extractable residue, weighing approximately 12 grams and having the texture of cellulose, is retained in suspension, being filtered from the aqueous solution after the foregoing ether extraction.

On the basis of molecular weight determinations (oxygen, hydrogen and carbon analysis), it is estimated that the water-insoluble portion of the product, recovered from the ether solution, comprises saccharide alkylates containing an average of 1.3 glucose units per molecule. The water-soluble portion of the product comprises alkyl saccharides containing an average of about 3.1 glucose units per molecule containing an average of about 1.2 nonyl radicals per glucose trimer.

In a manner similar to the procedure indicated above, several mono-alkyl and dialkyl ethers are prepared (by reducing or increasing the molar ratio of alkyl halide to sodium cellulose to provide from 1 to 2 hydrocarbon groups per glucose trimer unit in the ultimate hydrolysate) selected from the mono-propyl-, mono-hexyl-, di-hexyl, mono-cyclohexyl, mono-benzyl-, mono-hexylphenyl-, nonyl, mono-dodecyl, and mono-octadecyl ethers and by the indicated selective hydrolysis, the corresponding mono- and diethers of oligo-glucose are prepared, their solubility in water and petroleum ether determined and their surface activity evaluated. The following Table I presents the results of these tests:

*Table I*

PROPERTIES OF MONO- AND DI-ALKYL ETHERS OF GLUCOSE [1] AND OLIGOGLUCOSIDE [2]

| Alkyl Group (A) | Solubility in $H_2O$ at 70° C. | Solubility in Petroleum Ether | Surface Activity, Percent [3] | |
|---|---|---|---|---|
| | | | In $H_2O$ | In Pet. Ether |
| mono-propyl glucose | Very soluble | Insoluble | 10–15 | (5) |
| mono-propyl-oligoglucoside | do | do | 5–10 | (5) |
| mono-hexyl-glucose | Very slightly soluble | Quite soluble | (4) | 40–45 |
| mono-hexyl-oligoglucoside | Very soluble | Slightly soluble | 50–55 | (5) |
| di-hexyl-glucose | Insoluble | Soluble | (4) | 55–60 |
| di-hexyl-oligoglucoside | Soluble | Slightly soluble | 110–120 | (5) |
| mono-cyclohexylglucose | Insoluble | Soluble | (4) | 55–60 |
| mono-cyclohexyl-oligoglucoside | Soluble | Slightly soluble | 80–85 | (5) |
| mono-nonylglucose | Insoluble | Soluble | (4) | 105–115 |
| mono-nonyl-oligoglucoside | Soluble | Insoluble | 110–115 | (5) |
| di-nonylglucose | do | Soluble | | 100–105 |
| di-nonyl-oligoglucoside | Quite soluble | Slightly soluble | 115–120 | (5) |
| mono-dodecylglucose | Insoluble | Soluble | | 100–110 |
| mono-dodecyl-oligoglucoside | Soluble | Less soluble than Dodecylglucose | 120–125 | 110–115 |
| mono-octadecylglucose | Insoluble | Very soluble | (4) | 105 |
| mono-octadecyl-oligoglucoside | Sparingly soluble | Quite soluble | 110–115 | 120–125 |

[1] Water-insoluble ethers containing an average of about 1.2 glucose residues per molecule, estimated.
[2] Water-soluble portion of product containing an average of about 3.1 glucose residues per molecule estimated.
[3] Surface activity is measured by comparison of the soil-removing ability of the sample with the ability of a standard surface active agent, which for aqueous systems is a 0.3% aqueous solution of sodium palmitate in distilled water at 70° C. and for a sample soluble to any substantial extent in petroleum ether, with a 0.3% solution in petroleum ether of dinonylnaphthalene sulfonate (sodium salt), the soil removing ability being measured by comparison of light reflectance from a 3" x 5" soiled swatch of cotton muslin laundered in a solution of the standard (taken at 100%) and a similar soiled swatch of cotton muslin laundered in a solution of equivalent concentration of the sample. The swatches were soiled by dipping into a pentane suspension of lard and carbon black, followed by evaporation of the pentane from the swatch.
[4] Not soluble to the extent of 0.3% by weight in water at 70° C.
[5] Not soluble to the extent of 0.3% by weight in petroleum ether at 70° C.

It is concluded from the above results that a single alkyl substitutent on the glucose nucleus of less than six carbon atoms does not produce a glucose alkylate having any significant degree of surface activity whereas a glucose alkylate in which the aggregate number of carbon atoms residing in said alkyl groups is at least nine, but not more than twenty are effective surface active agents in non-aqueous solvents such as petroleum ether, being substantially insoluble in water at 70° C. The oligoglusoside alkylates (i.e., containing from 2 to 4 and an average of about 3.1 glucose residues per molecule) are water-soluble surface active agents until the number of carbon atoms resident in the hydrocarbon substituents of the ether radicals exceeds about twenty in number; when the aggregate number of carbon atoms in the hydrocarbon groups is between twelve and twenty, the alkylated oligoglucoside is a highly effective, water-soluble, nonionic detergent.

I claim as my invention:

A water-soluble surface active agent having the following empirical formula:

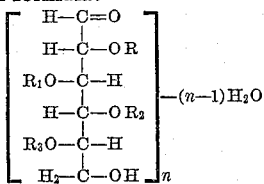

wherein $R$, $R_1$, $R_2$ and $R_3$ are selected from the group consisting of hydrogen and monovalent hydrocarbon containing at least six and not more than twenty carbon atoms and $n$ is a whole number having a value of from 2 to 4, said surface active agent being further characterized in that at least one and less than all of said $R$, $R_1$, $R_2$ and $R_3$ is said monovalent hydrocarbon group, the total aggregate number of carbon atoms in said monovalent hydrocarbon radicals being not in excess of twenty per molecule.

References Cited in the file of this patent

UNITED STATES PATENTS

| | | |
|---|---|---|
| 2,553,725 | Rogers et al. | May 22, 1951 |
| 2,572,923 | Gaver et al. | Oct. 30, 1951 |
| 2,585,035 | Roach et al. | Feb. 12, 1952 |
| 2,671,780 | Gaver et al. | Mar. 9, 1954 |

OTHER REFERENCES

Journal Chemical Society (London), 1951, Part III, pages 2568–72.